(12) United States Patent
Gow et al.

(10) Patent No.: US 9,481,464 B2
(45) Date of Patent: Nov. 1, 2016

(54) TABLE ARRANGEMENT

(71) Applicant: Zodiac Seats UK Limited, Cwmbran (GB)

(72) Inventors: Robert Gow, Chepstow (GB); Paul Morgan, Nantyglo (GB)

(73) Assignee: Zodiac Seats UK Limited, Cwmbran (GB)

( * ) Notice: Subject to any disclaimer, the term of this patent is extended or adjusted under 35 U.S.C. 154(b) by 0 days.

(21) Appl. No.: 14/679,136

(22) Filed: Apr. 6, 2015

(65) Prior Publication Data

US 2015/0284089 A1 Oct. 8, 2015

(30) Foreign Application Priority Data

Apr. 7, 2014 (GB) .................................. 1406238.4

(51) Int. Cl.
*A47B 83/02* (2006.01)
*B64D 11/06* (2006.01)

(52) U.S. Cl.
CPC ....... *B64D 11/0605* (2014.12); *B64D 11/0638* (2014.12)

(58) Field of Classification Search
CPC .. B64D 11/06; B64D 11/0638; B60N 2/242; B60N 3/002
USPC .................................. 297/144, 145, 146, 147
See application file for complete search history.

(56) References Cited

U.S. PATENT DOCUMENTS

| | | | | |
|---|---|---|---|---|
| 2,741,300 A * | 4/1956 | Tubbs | ...................... | A47C 7/70 297/145 |
| 3,583,760 A * | 6/1971 | McGregor | ............. | A47B 5/006 297/145 |
| 3,632,161 A * | 1/1972 | Arfaras | .................... | A47C 7/70 297/145 X |
| 4,852,940 A * | 8/1989 | Kanigowski | ............. | A47B 5/00 297/145 |
| 4,944,552 A * | 7/1990 | Harris | ....................... | A47C 7/70 297/145 |
| 5,050,929 A * | 9/1991 | Gueringer | ................ | A47C 7/70 297/145 |
| 5,927,799 A * | 7/1999 | Tornero | ................... | A47C 7/70 297/145 |
| 7,311,354 B2 * | 12/2007 | Giasson | ............. | B64D 11/0638 297/145 |
| 7,506,923 B1 * | 3/2009 | Gauss | .................... | B60N 3/002 297/149 |
| 7,721,657 B2 * | 5/2010 | Carstensen | ............ | A47B 5/006 108/134 |
| 8,205,562 B2 * | 6/2012 | St. Louis | ........... | B64D 11/0638 108/38 |

(Continued)

OTHER PUBLICATIONS

Great Britain Patent Application No. 1406238.4, Search Report issued Oct. 17, 2014, 3 pages.

*Primary Examiner* — Rodney B White
(74) *Attorney, Agent, or Firm* — Kilpatrick Townsend & Stockton LLP; Dean W. Russell (57) ABSTRACT

The present invention provides table arrangement comprising a housing that has an open configuration and a closed configuration, a table, which, when in a stowed configuration is at least partially housed in the housing, and when in a presented configuration, is partially protruding from the housing, and an activation mechanism for opening and closing the housing, which is linked by a mechanical linkage to the table or housing such that when the activation mechanism closes the housing, the table changes from the presented configuration to the stowed configuration. The invention also provides an aircraft seat module, an aircraft and a method of stowing a table arrangement.

26 Claims, 5 Drawing Sheets

(56) References Cited

U.S. PATENT DOCUMENTS

| | | | | |
|---|---|---|---|---|
| 8,205,563 B2* | 6/2012 | St. Louis | | B64D 11/00 108/40 |
| 8,205,564 B2* | 6/2012 | St. Louis | | B64D 11/0638 108/147 |
| 8,336,956 B2* | 12/2012 | Westerink | | B64D 11/06 297/147 X |
| 8,528,968 B2* | 9/2013 | Moulton | | B64D 11/06 297/147 |
| 8,979,189 B2* | 3/2015 | Henshaw | | A47B 83/02 297/147 X |
| 9,102,410 B2* | 8/2015 | Frost | | B64D 11/06 |
| 9,150,129 B2* | 10/2015 | Suhre | | B60N 2/4606 |
| 2002/0003361 A1* | 1/2002 | Duerr | | B60N 2/4606 297/147 |
| 2007/0227407 A1 | 10/2007 | Cartensen | | |
| 2009/0078169 A1* | 3/2009 | Osborne | | A47B 5/006 108/40 |
| 2012/0133180 A1 | 5/2012 | Smith et al. | | |

\* cited by examiner

TABLE ARRANGEMENT

CROSS-REFERENCE TO RELATED APPLICATION

This application claims priority to Great Britain Application No. 1406238.4, filed Apr. 7, 2014, entitled "A Table Arrangement," which is incorporated herein by reference in its entirety.

BACKGROUND OF THE INVENTION

The present invention concerns a table arrangement for use in an aircraft seat module. More particularly, but not exclusively, this invention concerns a table arrangement comprising a housing that has an open configuration and a closed configuration, a table, which, when in a stowed configuration is at least partially housed in the housing, and when in a presented configuration, is partially protruding from the housing, and an activation mechanism for opening and closing the housing. The invention also concerns an aircraft seat module, an aircraft or a method of deploying or stowing a table arrangement.

A prior art table arrangement comprises a table, which is stowed in a housing and can be "presented" (i.e. so that a small portion of the table is protruding out of the housing). This allows a user to be able to grip the table and pull it up into a deployed (useable) position). To deploy the table, a user must open the housing by pulling on a door handle to rotate the door 20 to 30 degrees. This reveals an aperture through which the table can deploy. The opening of the door pulls on a cable which activates a gas spring to "present" the table.

When a user stows the table, they are required to push the table in (against the gas spring) from the presented position to the stowed position. This could be problematic in that a passenger may catch their fingers or nails in the housing. They may also not push the table in far enough (especially given that a relatively large force might be required to do so). Also, if the door is closed before the table has been (adequately) pushed into the stowed position, this could again cause damage to the table or door or associated mechanisms. In addition, if the table was not stowed properly and a user went to subsequently open the door, activating the gas spring, this may cause the table to abut and possibly jam against the inside of the door before it had fully opened.

The present invention seeks to mitigate the above-mentioned problems. Alternatively or additionally, the present invention seeks to provide an improved table arrangement.

SUMMARY OF THE INVENTION

The present invention provides, according to a first aspect, a table arrangement for use in an aircraft seat module, the table arrangement comprising a housing that has an open configuration and a closed configuration, a table, which, when in a stowed configuration is at least partially housed in the housing, and when in a presented configuration, is partially protruding from the housing, and an activation mechanism for opening and closing the housing, wherein the activation mechanism is linked by a mechanical linkage to the table or housing such that when the activation mechanism closes the housing, relative movement is caused between the table and the housing such that the table changes from the presented configuration to the stowed configuration.

This means that the table is to be stowed when the activation mechanism closes the housing. This prevents the table and the housing (for example, a door of the housing) from abutting, jamming and potentially causing damage. It also means that stowage of the table is easier, quicker and simpler for the user.

It is noted that the mechanical linkage between the activation mechanism and the table/housing may not necessarily be a permanent/constant mechanical connection. It simply means that they are mechanically linked such that the required movement (the stowage of the table) is caused by the movement of the activation mechanism. For example, the mechanical linkage may comprise an element that is moved by the activation mechanism and towards the table/housing to then move the table/housing.

Preferably, the activation mechanism is linked by a mechanical linkage to the table or housing such that when the activation mechanism opens the housing, relative movement is caused between the table and the housing such that the table changes from the stowed configuration to the presented configuration. In other words, preferably, movement of the activation mechanism can cause both stowage and presentation of the table.

Preferably, the activation mechanism is linked by a mechanical linkage to the table, such that when the activation mechanism closes the housing, the table is caused to move from the presented configuration to the stowed configuration, and, preferably, when the activation mechanism opens the housing, the table is caused to move from the stowed configuration to the presented configuration. In other words, preferably, the activation mechanism causes movement of the table (rather than the housing).

More preferably, the activation mechanism is rotatably mounted to the housing at a first location on the activation mechanism, such that the activation mechanism closes and preferably opens the housing by rotating about the first location with respect to the housing.

Even more preferably, the mechanical linkage comprises an activation lever rotatably mounted to the housing, such that when the activation mechanism is rotated about the first location with respect to the housing, the activation lever is caused to rotate with respect to the housing.

Even more preferably, the activation lever is located adjacent the table such that when the activation lever is caused to rotate with respect to the housing, the table is caused to move translationally with respect to the housing.

Even more preferably, the activation lever comprises a cam element, such that the activation lever causes the table to move in a first translation direction when the activation lever is rotated in a first rotation direction, and a second translation direction when the activation lever is rotated in a second, opposite rotation direction. For example, this allows the table to be pushed and pulled by the activation lever.

Preferably, the mechanical linkage comprises a connection link rotatably mounted to the activation mechanism at a second location on the activation mechanism, the second location being displaced from the first location, such that when the activation mechanism is rotated about the first location with respect to the housing, the connection link is caused to move translationally with respect to the housing.

More preferably, the activation lever is rotatably mounted to the connection link at a first location on the activation lever and rotatably mounted to the housing at a second location on the activation lever, the second location being displaced from the first location, such that when the connection link is caused to move translationally with respect to the housing, the activation lever is caused to rotate with respect to the housing.

Even more preferably, the connection link is a lever capable of when under tension, moving translationally in a first direction with respect to the housing, and thereby causing the activation lever to rotate in a first rotation direction, when under compression, moving translationally in a second, opposite direction with respect to the housing, and thereby causing the activation lever to rotate in a second, opposite rotation direction.

Alternatively, the connection link is a cable, capable of, when under tension, moving translationally in a first direction with respect to the housing, and thereby causing the activation lever to rotate in a first rotation direction, and wherein the activation lever is biased towards a second, opposite rotation direction.

Preferably, the activation lever is biased towards the second, opposite rotation direction by a spring.

Alternatively, the connection link is connected to a rotatably mounted element, such that when the connection link moves translationally with respect to the housing, the rotatably mounted element rotates, and wherein the activation lever is attached to the rotatably mounted element such that it rotates as the rotatably mounted element rotates.

Preferably, the rotatably mounted element comprises a gear and wherein the connection link comprises a rack, corresponding to the gear, such that the gear and activation lever are rotated by translational movement of the rack.

More preferably, the rotatably mounted element comprises a drum and wherein the connection link comprises a cable, such that the drum and activation lever are rotated in a first rotation direction by translational movement of the cable.

Even more preferably, the activation lever is biased towards a second, opposite rotation direction by a spring.

Preferably, the activation mechanism comprises a door of the housing for closing the housing, such that when the activation mechanism closes the housing, the door is moved to cover an aperture through which the table can protrude.

Preferably, the table is slidably mounted such that it can slide out of the housing from the presented configuration to a deployed configuration.

More preferably, the table is deployed upwardly from the presented position to the deployed position.

Preferably, the table rotates from the substantially vertical stowed position to the substantially horizontal deployed position.

More preferably, the table comprises a cam follower, slidably mounted in an angled cam track such that the angle of the table depends on the distance the table has been slid out of the housing.

Preferably, the table comprises a table surface, for use in the deployed position, and an opposite non-table surface and wherein, when stowed, the table surface faces a distal side of the housing, away from the location of the table in the deployed position.

Preferably, the position of the table, relative to the housing, between the presented and stowed configurations is dictated by the mechanical linkage based on the position of the activation mechanism. In other words, there is a one-to-one relationship of the position of the activation mechanism and the table/housing (at least from the presented configuration to the stowed configuration, and preferably also in reverse).

According to a second aspect of the invention there is also provided an aircraft seat module comprising a seat, a table arrangement of any preceding claim, and a mounting structure, wherein the housing of the table arrangement is mounted to the mounting structure of the aircraft seat module.

Preferably, the mounting structure is located to one side of the seat.

According to a third aspect of the invention there is also provided an aircraft comprising the table arrangement or aircraft seat module as described above.

According to a fourth aspect of the invention there is also provided a method of stowing a table arrangement of an aircraft seat module, the table arrangement comprising a housing, a table and an activation mechanism, the method comprising the steps of moving an activation mechanism to close the housing of the table arrangement, thereby causing relative movement between the table and the housing from a presented configuration, in which the table is partially protruding from the housing, to a stowed configuration, in which the table is at least partially housed in the housing.

A damping and compensation arrangement between the table and the housing is described and claimed in UK patent application entitled "A Table Arrangement" with agent's reference "P022769GB ECT", having the same filing date as the present application. The contents of that application are fully incorporated herein by reference. The claims of the present application may incorporate any of the features disclosed in that patent application.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
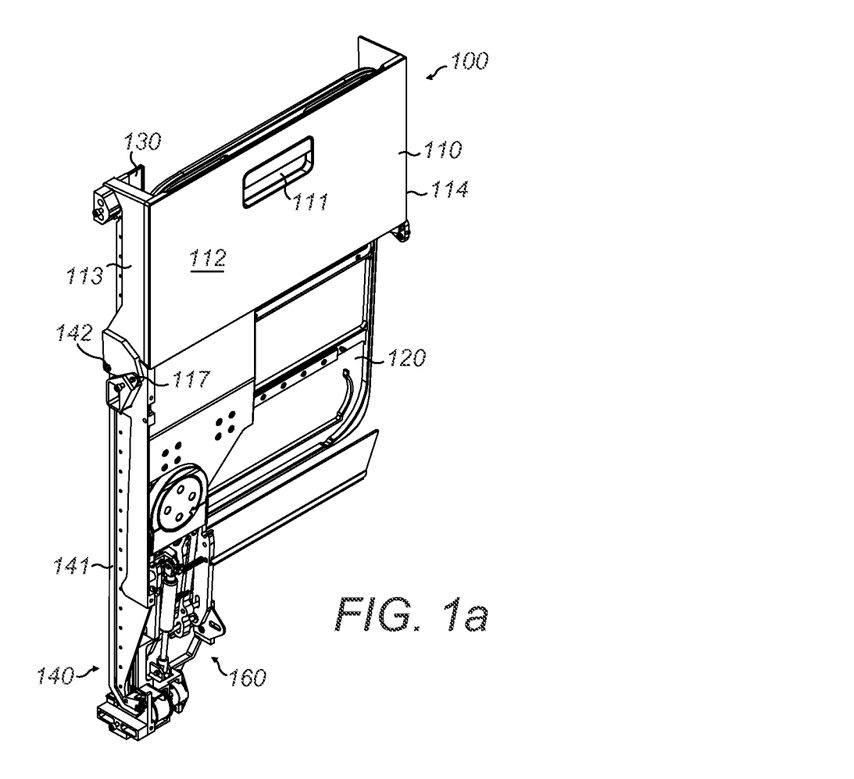
FIG. 1a shows a perspective view of a table arrangement according to a first embodiment of the invention, in a stowed configuration.
Figure 1B:
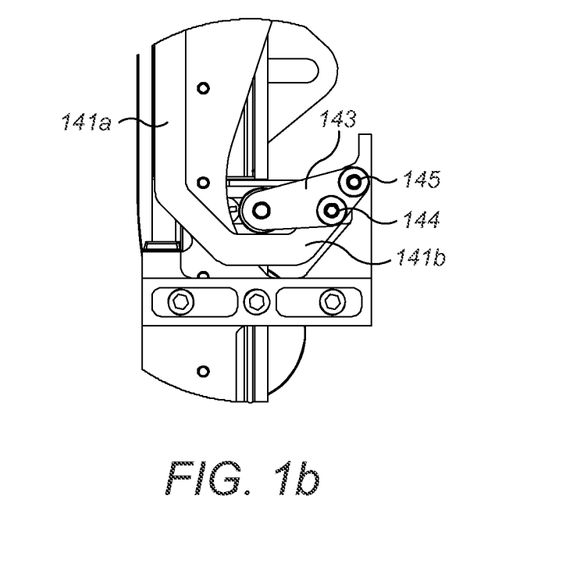
FIG. 1b shows a side enlarged view of a connection link and activation lever of part of the table arrangement of FIG. 1a, in the stowed configuration.
Figure 1C:
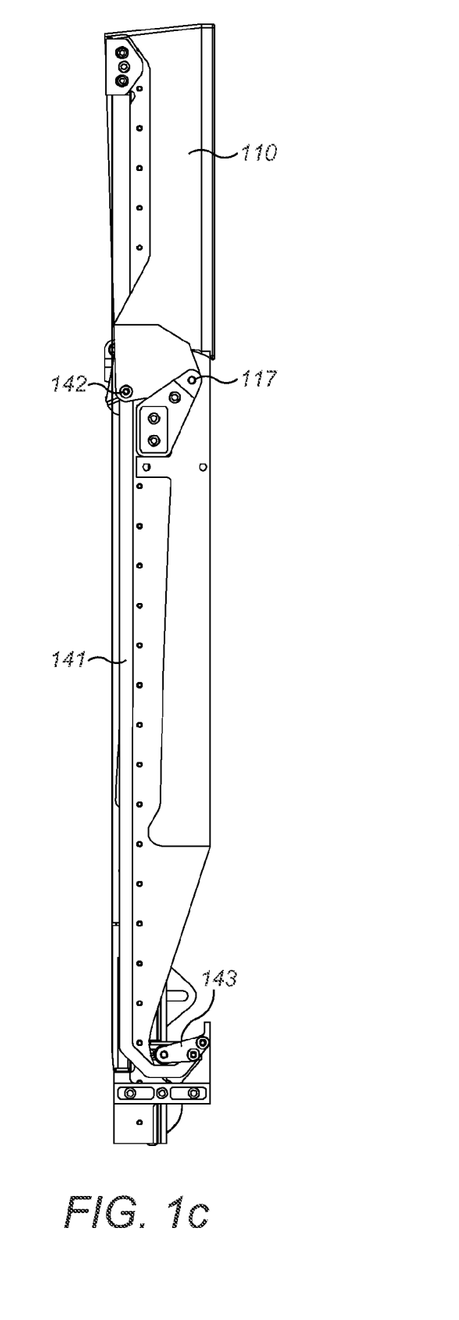
FIG. 1c shows a side view of the table arrangement in the stowed configuration; arrangement in a presented configuration.

FIGS. 1a, 1b and 1c show views of a table arrangement 100 according to a first embodiment of the invention, in a stowed configuration.

The table arrangement 100 comprises a door 110 with a rectangular front face 112, a left side panel 113 and a right side panel 114. A handle 111 is located towards the top of the front face 112. The door 110 is pivotally mounted to a table housing 130. The door is pivotally mounted by hinges 117 on the two side panels 113, 114 towards the front and bottom of the side panels. The door 110 also a cam track 115 (shown in FIG. 3*b*, as described later) on an internally facing surface of the side panel 114.

A table 120 is stowed vertically in the housing 130, with the top edge sitting flush with the top portion of the door 110. The table has a working table surface 121 (shown in FIG. 4*b*) and an underneath surface 121 (seen in FIG. 1*a*, among others). Connected to the table is an activation portion 125 at the bottom of the housing 130. The activation portion 125 will be described later (in relation to FIGS. 2*b* and 2*d*). The table 120 also comprises a finger hold 129 on its underneath surface 122 for allowing a user/passenger to pull the table 120 out of the housing 130.

A mechanical linkage 140 connects the table 120 to the door 110 such that opening the door automatically moves the table to a presented position, where the top edge of the table protrudes above the door 110.

The mechanical linkage 140 comprises two connection links 141 pivotally mounted to the door 110. Each link 141 is pivoted at a hinge points 142 located at the bottom of each of the two side panels 113, 114, but further back than the hinges 117. Each link 141 comprises an elongate portion 141*a* that extends downwards from the hinge 142 and an upturned portion 141*b*, which extends forwards and up. At the tip of the upturned portion is mounted an activation cam lever 143.

The activation lever 143 comprises an angled base portion and a tapered top end portion. The activation lever 143 is pivotally mounted on the tip of the connection link 141 at a hinge 144 at one side of the angled base. Also at the angled base, displaced sideways and vertically from the hinge 144, the activation lever 143 is pivotally mounted at a hinge 145 to the housing 130. At the top end portion of the activation lever is a cam follower element 146.

In the stowed position, the activation lever 143 lies approximately horizontal with hinge 145 being above hinge 144.

A damping and compensation arrangement 160 is connected between the table 120 and the housing 130 to reduce the speed of the table 120 when it is dropped from a deployed or the presented position to the stowed position.

Figure 2A:
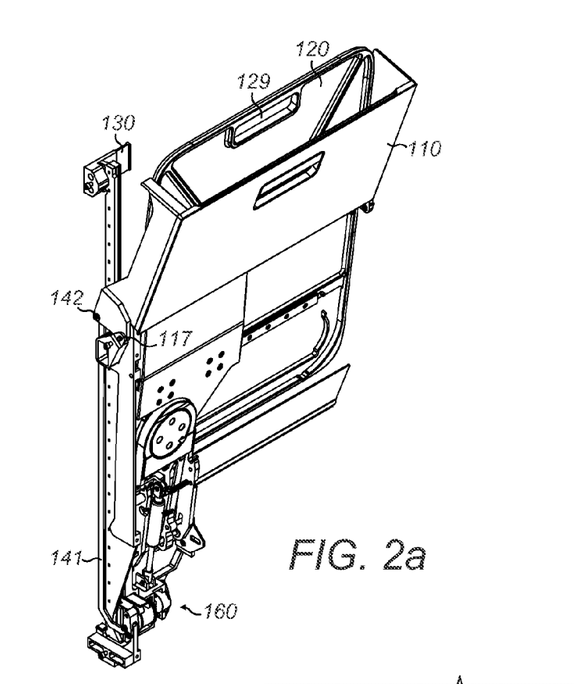
FIG. 2b shows a side enlarged view of the connection link and activation lever, in the presented configuration.
FIG. 2c shows a side view of the table arrangement in the presented configuration.
FIG. 2d shows a perspective enlarged view of the activation lever, in the presented configuration.
Figure 2B:
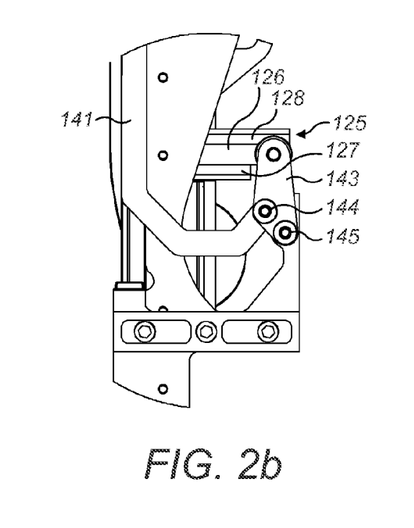
Figure 2C:
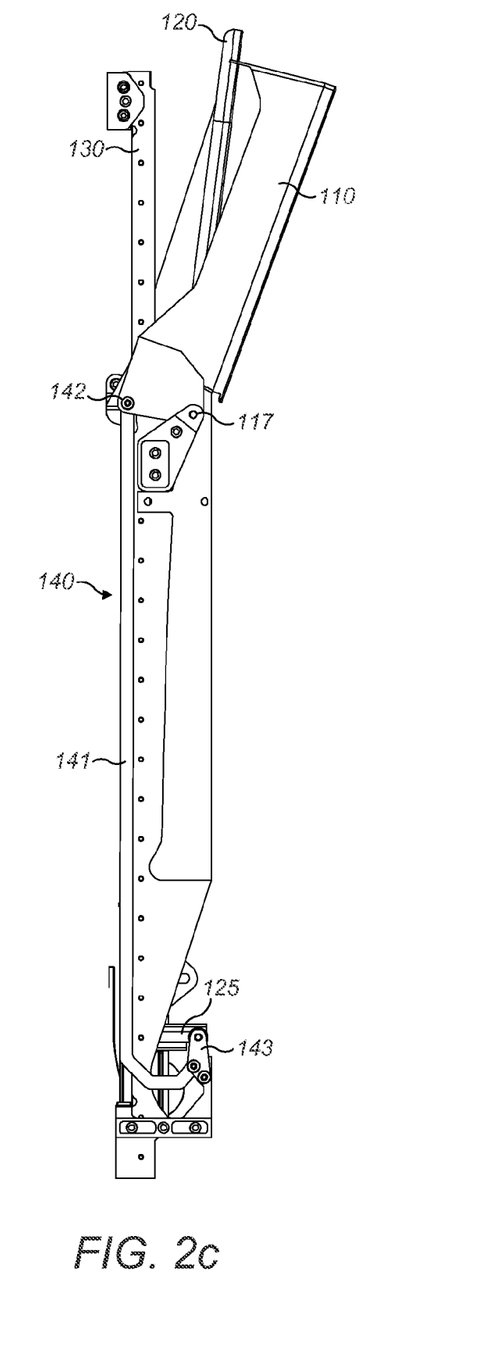

FIGS. 2*a*, 2*b* and 2*c* show views of the table arrangement in the presented configuration. Here, the door 110 has been opened by pulling on the handle 111 to pivot the door 110 on the hinges 117 by approximately 20 to 30 degrees. As a result of the door 110 pivoting on hinge 117, the hinge 142 on the door automatically raises. This pulls on the connection link 141 and causes this to raise. Hence, the hinge 144 on the upturned portion 141*b* of the link 141 is also raised. This causes the hinge 144 to move to be above hinge 145. This causes the activation link 143 to rotate approximately 90 degrees clockwise to be substantially vertical.

Figure 2D:
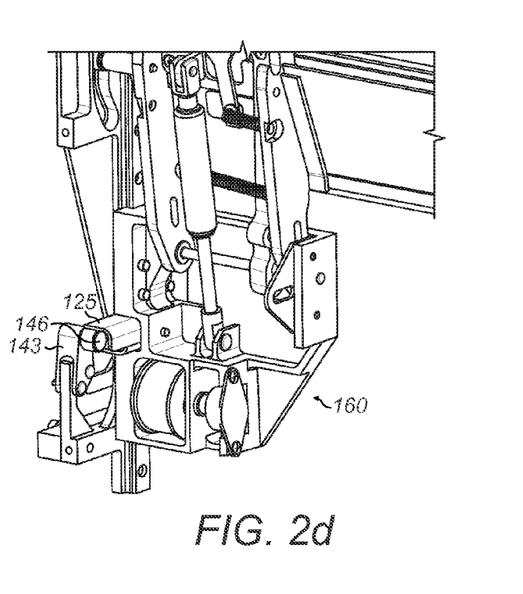

As can be seen more clearly in FIGS. 2*b* and 2*d*, the cam follower element 146 at the end of the activation lever 143 is adjacent a channel 128 between an upper abutment surface 126 and a lower abutment surface 127 of the activation portion 125 of the table 120. Hence, as the activation lever 143 is pivoted (clockwise as seen in the view of FIG. 2*b*) by the connection link 141 to be vertical, the cam follower element 146 pivots to push upwards on the upper abutment surface 126. This causes the table 120 to be raised from the stowed position to the raised position.

The cam follower element 146 also acts in reverse. Hence, when the door 110 is shut, hinge 142 moves back down to the stowed position, also causing connection link 141 and hinge 144 to move back down. Hence, the activation lever 143 moves back down to its previous horizontal position (rotating anti-clockwise as seen in the view of FIG. 2*b*). As it does so the cam follower element 146 pushes down on the lower abutment surface 127 to pull the table 120 back down from the presented position to the stowed position.

Figures 3A, 3B:
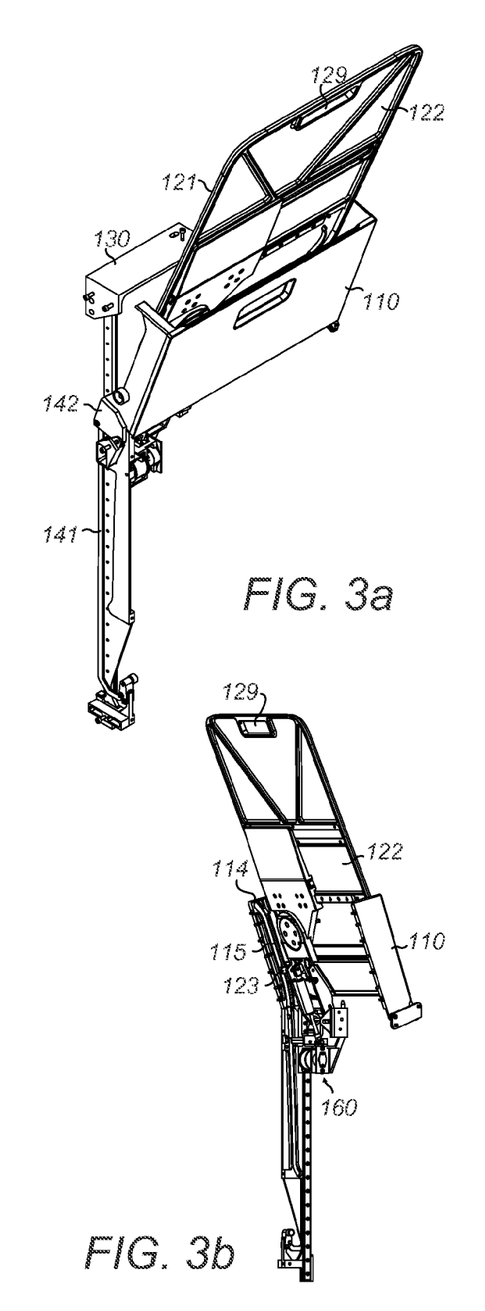
FIG. 3a shows a perspective view of the table arrangement, in a partially deployed configuration.
FIG. 3b shows a different perspective view of the table arrangement, in the partially deployed configuration.

From the presented position, a user/passenger can lift the table 120 (by pulling on finger hold 129) to a partially deployed position. FIGS. 3*a* and 3*b* show views of the table arrangement in the partially deployed configuration. As can be seen in FIG. 3*b*, the door 110 has a cam track 115 on the internally facing surface of the side panel 114. The table 120 is provided with a cam follower nodule 123 that is arranged inside the cam track. Hence, when pulling on the table 120, the table 120 follows the path dictated by the cam track 115.

Figure 4A:
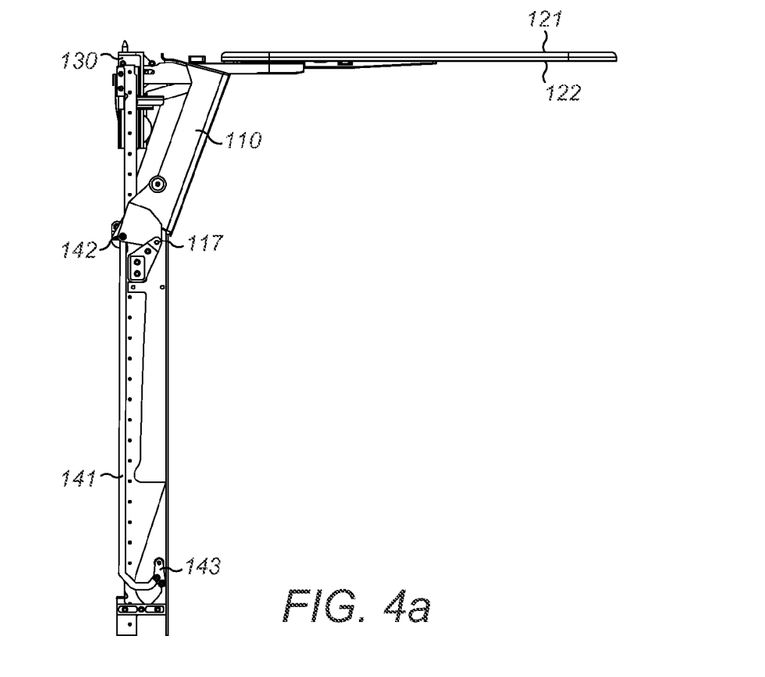
FIG. 4a shows a side view of the table arrangement in a fully deployed configuration.
Figure 4B:
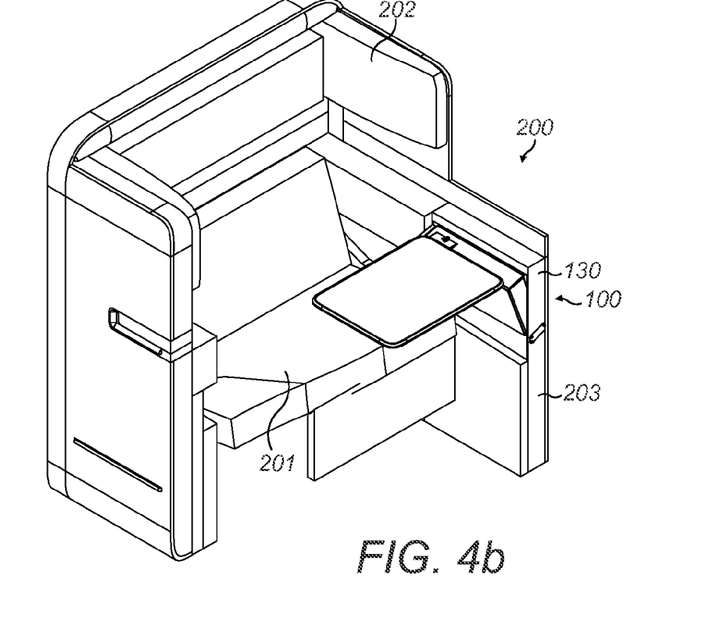
FIG. 4b shows a perspective view of the table arrangement in the fully deployed configuration, mounted in an aircraft seat module.

FIG. 4*b* shows the table arrangement 100 in place in an aircraft seat module 200. The aircraft set module comprises a seat 201 with an exterior shell 202 behind the seat. It also comprises a side console 203 in which the table arrangement 100 is provided. In particular, it is noted that the side console 203 provides the housing 130 of the table arrangement 100.

In use, the table 120 is moved from a stowed position to a presented position by opening door 110. As described before, this causes the table to automatically move up to the presented position. From here, a user/passenger can pull the table up to the partially deployed position and then pivot the table 120 to its fully deployed horizontal position.

To stow the table 120, it is pivoted to its angled partially deployed position, and then pushed back into (or allowed to drop back into) the presented position. From there, the door 110 is shut which automatically drops the table 120 back down to the stowed position.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The above described embodiment uses a connecting link 141 attached to the door 110 (which is lowered and raised on closing and opening the door), an activation lever 143 (that is pivoted by the lowering and raising of the connection lever 141), and a cam follower element 146 on the activation lever (that pulls and pushed on a table activation portion 125 to lower and raise the table 120).

However, there are many other ways of achieving the same outcome. Some will be described here.

i) Rack and Pinion Mechanism—A pinion gear could be located at hinge 145. A rack would be attached instead of the connection link 141 (i.e. to hinge 142) and also attached to drive the pinion gear. A cam lever (like activation lever 143) would be attached to the pinion gear. Hence, when the door 110 is opened/closed, hinge 142 would raise/lower, and the rack would raise/lower. This would cause the pinion gear at 145 to be driven clockwise/anti-clockwise and the cam lever to be rotated clockwise/ant-clockwise (i.e. moving from horizontal to vertical/vertical to horizontal).

ii) Cable and Spring Mechanism—The connection link 141 is replaced by a cable, connected to hinge 142 and to a cam lever (like activation lever 143). A spring is attached to the cam lever such that it urges the cam lever into a default horizontal position. Hence, when the door 110 is opened, hinge 142 would raise, and the cable would raise. This would cause the cam lever to be rotated clockwise (i.e. moving from horizontal to vertical). When the door 110 is closed, hinge 142 would lower, and the tension in the cable would be released. This would allow the cam lever to be rotated anti-clockwise under action of the spring (i.e. moving from vertical to horizontal).

iii) Cable and Spring Mechanism—This is similar to ii) but with the cable coupled on a drum (so it can be wrapped around the drum) at hinge 145 and the cam lever attached to that drum. The drum is biased by a spring to wind the cable. Hence, when the door 110 is opened, hinge 142 would raise, and the cable would unwind the drum. This would cause the cam lever to be rotated clockwise (i.e. moving from horizontal to vertical). When the door 110 is closed, hinge 142 would lower, and the tension in the cable would be released and the drum would wind the cable in. This would cause the cam lever to be rotated anti-clockwise under (i.e. moving from vertical to horizontal).

It is also possible to have embodiments where there is no cam follower element 146 (i.e. an element that acts on the table 120 in both directions) and where the table is only moved by the door 110 in one direction. In other words, the table 120 may be automatically presented by opening the door, but not automatically stowed on closing the door (or vice versa).

Another alternative is that the opening and/or closing of the door 110 may cause movement of the housing 130, rather than the table 120. This would still result in the table 120 changing between stowed and presented configurations (i.e. housed or protruding with respect to the table).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A table arrangement for use in an aircraft seat module, the table arrangement comprising:
    a housing that has an open configuration and a closed configuration,
    a table, which, when in a stowed configuration is at least partially housed in the housing, and when in a presented configuration, is partially protruding from the housing, and
    an activation mechanism for opening and closing the housing, wherein the activation mechanism is linked by a mechanical linkage to the table or housing such that when the activation mechanism closes the housing, relative movement is caused between the table and the housing such that the table changes from the presented configuration to the stowed configuration.

2. A table arrangement as claimed in claim 1, wherein the activation mechanism is linked by the mechanical linkage to the table or housing such that when the activation mechanism opens the housing, relative movement is caused between the table and the housing such that the table changes from the stowed configuration to the presented configuration.

3. A table arrangement as claimed in claim 1, wherein the activation mechanism is linked by a mechanical linkage to the table such that
    when the activation mechanism closes the housing, the table is caused to move from the presented configuration to the stowed configuration.

4. A table arrangement as claimed in claim 3, wherein when the activation mechanism opens the housing, the table is caused to move from the stowed configuration to the presented configuration.

5. A table arrangement as claimed in claim 3, wherein the activation mechanism is rotatably mounted to the housing at a first location on the activation mechanism, such that the activation mechanism closes the housing by rotating about the first location with respect to the housing.

6. A table arrangement as claimed in claim 5, wherein the activation mechanism opens the housing by rotating about the first location with respect to the housing.

7. A table arrangement as claimed in claim 5, wherein the mechanical linkage comprises an activation lever rotatably mounted to the housing, such that when the activation mechanism is rotated about the first location with respect to the housing, the activation lever is caused to rotate with respect to the housing.

8. A table arrangement as claimed in claim 7, wherein the activation lever is located adjacent the table such that when the activation lever is caused to rotate with respect to the housing, the table is caused to move translationally with respect to the housing.

9. A table arrangement as claimed in claim 8, wherein the activation lever comprised a cam element, such that the activation lever causes the table to move in a first translation direction when the activation lever is rotated in a first rotation direction, and a second translation direction when the activation lever is rotated in a second, opposite rotation direction.

10. A table arrangement for use in an aircraft seat module, the table arrangement comprising:
    a housing that has an open configuration and a closed configuration,
    a table, which, when in a stowed configuration is at least partially housed in the housing, and when in a presented configuration, is partially protruding from the housing, and
    an activation mechanism for opening and closing the housing, wherein the activation mechanism is (i) rotatably mounted to the housing at a first location on the activation mechanism, such that the activation mechanism closes, and opens, the housing by rotating about the first location with respect to the housing and (ii) linked by a mechanical linkage to the table such that when the activation mechanism closes the housing, the table is caused to move from the presented configuration to the stowed configuration, and when the activation mechanism opens the housing, the table is caused to move from the stowed configuration to the presented configuration, and
    wherein the mechanical linkage comprises (i) an activation lever rotatably mounted to the housing, such that when the activation mechanism is rotated about the first location with respect to the housing, the activation lever is caused to rotate with respect to the housing, and (ii) a connection link rotatably mounted to the activation mechanism at a second location on the activation mechanism, the second location being displaced from the first location, such that when the activation mechanism is rotated about the first location with respect to the housing, the connection link is caused to move translationally with respect to the housing.

11. A table arrangement as claimed in claim 10, wherein the activation lever is rotatably mounted to the connection link at a first location on the activation lever and rotatably mounted to the housing at a second location on the activation lever, the second location being displaced from the first location, such that when the connection link is caused to move translationally with respect to the housing, the activation lever is caused to rotate with respect to the housing.

12. A table arrangement as claimed in claim 11, wherein the connection link is a lever configured to:
   i) when under tension, move translationally in a first direction with respect to the housing, and thereby cause the activation lever to rotate in a first rotation direction,
   ii) when under compression, move translationally in a second, opposite direction with respect to the housing, and thereby cause the activation lever to rotate in a second, opposite rotation direction.

13. A table arrangement as claimed in claim 11, wherein the connection link is a cable, configured to, when under tension, move translationally in a first direction with respect to the housing, and thereby cause the activation lever to rotate in a first rotation direction, and wherein the activation lever is biased towards a second, opposite rotation direction.

14. A table arrangement as claimed in claim 13, wherein the activation lever is biased towards the second, opposite rotation direction by a spring.

15. A table arrangement as claimed in claim 10, wherein the connection link is connected to a rotatably mounted element, such that when the connection link moves translationally with respect to the housing, the rotatably mounted element rotates, and wherein the activation lever is attached to the rotatably mounted element such that it rotates as the rotatably mounted element rotates.

16. A table arrangement as claimed in claim 15, wherein the rotatably mounted element comprises a gear and wherein the connection link comprises a rack, corresponding to the gear, such that the gear and activation lever are rotated by translational movement of the rack.

17. A table arrangement as claimed in claim 15, wherein the rotatably mounted element comprises a drum and wherein the connection link comprises a cable, such that the drum and activation lever are rotated in a first rotation direction by translational movement of the cable.

18. A table arrangement as claimed in claim 17, wherein the activation lever is biased towards a second, opposite rotation direction by a spring.

19. A table arrangement as claimed in claim 18, wherein the activation mechanism comprises a door of the housing for closing the housing, such that when the activation mechanism closes the housing, the door is moved to cover an aperture through which the table can protrude.

20. A table arrangement as claimed in claim 19, wherein the table is slidably mounted such that it can slide out of the housing from the presented configuration to a deployed configuration.

21. A table arrangement as claimed in claim 20, wherein the table comprises a cam follower, slidably mounted in an angled cam track such that the angle of the table depends on the distance the table has been slid out of the housing.

22. A table arrangement as claimed in claim 21, wherein the position of the table, relative to the housing, between the presented and stowed configurations is dictated by the mechanical linkage based on the position of the activation mechanism.

23. An aircraft seat module comprising:
   a seat,
   a table arrangement of claim 1, and
   a mounting structure,
wherein the housing of the table arrangement is mounted to the mounting structure of the aircraft seat module.

24. An aircraft seat module as claimed in claim 23, wherein the mounting structure is located to one side of the seat.

25. An aircraft comprising the table arrangement or aircraft seat module of claim 24.

26. A method of stowing a table arrangement of an aircraft seat module, the table arrangement comprising a housing, a table and an activation mechanism, the method comprising the steps of:
   moving an activation mechanism to close the housing of the table arrangement,
   thereby causing relative movement between the table and the housing from a presented configuration, in which the table is partially protruding from the housing, to a stowed configuration, in which the table is at least partially housed in the housing.

* * * * *